Oct. 20, 1959  B. D. BECK, SR., ET AL  2,909,005
GLASS MELTING FURNACE WITH BUBBLER PATTERNS
Filed Nov. 13, 1956  4 Sheets-Sheet 3

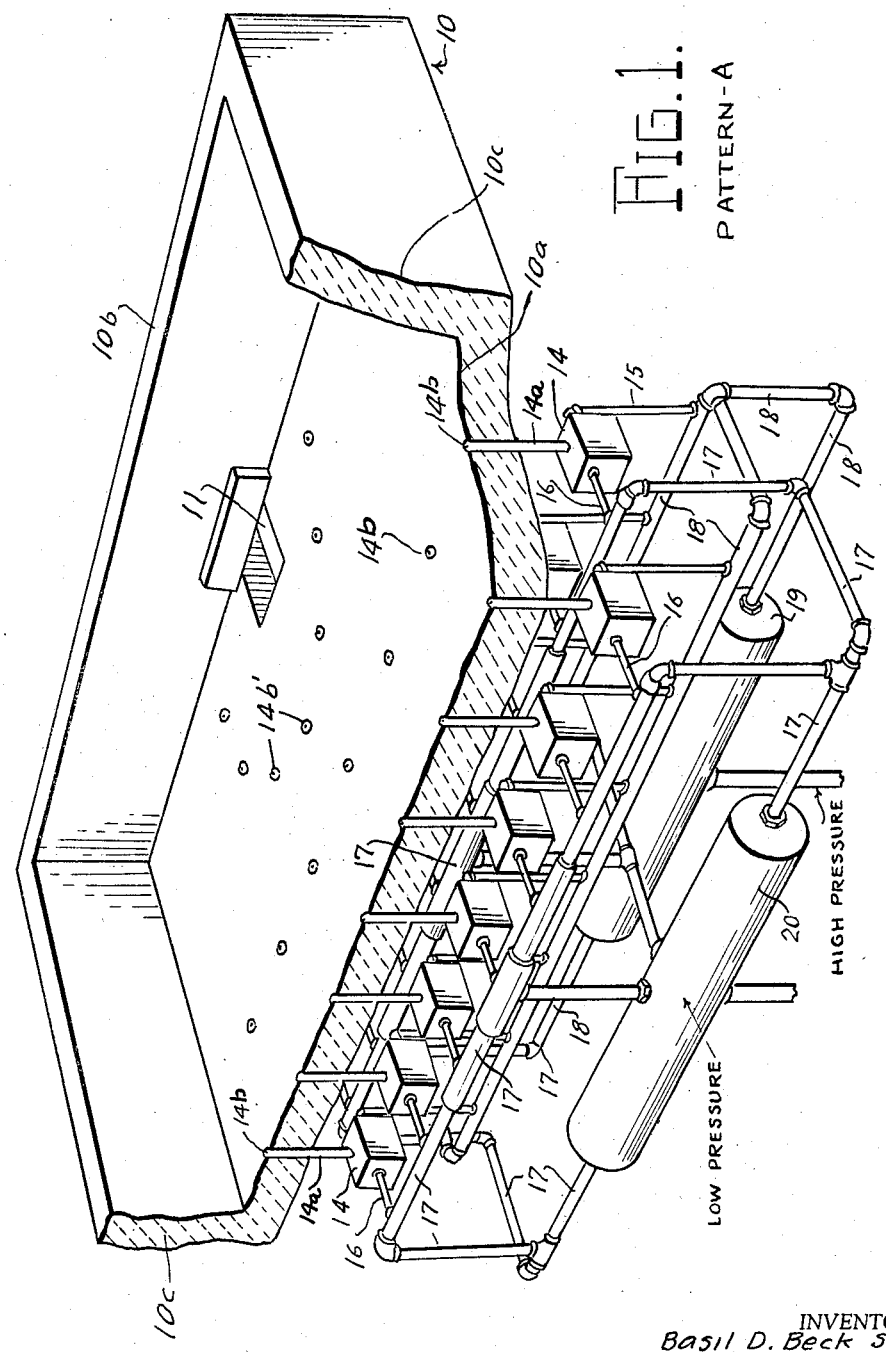

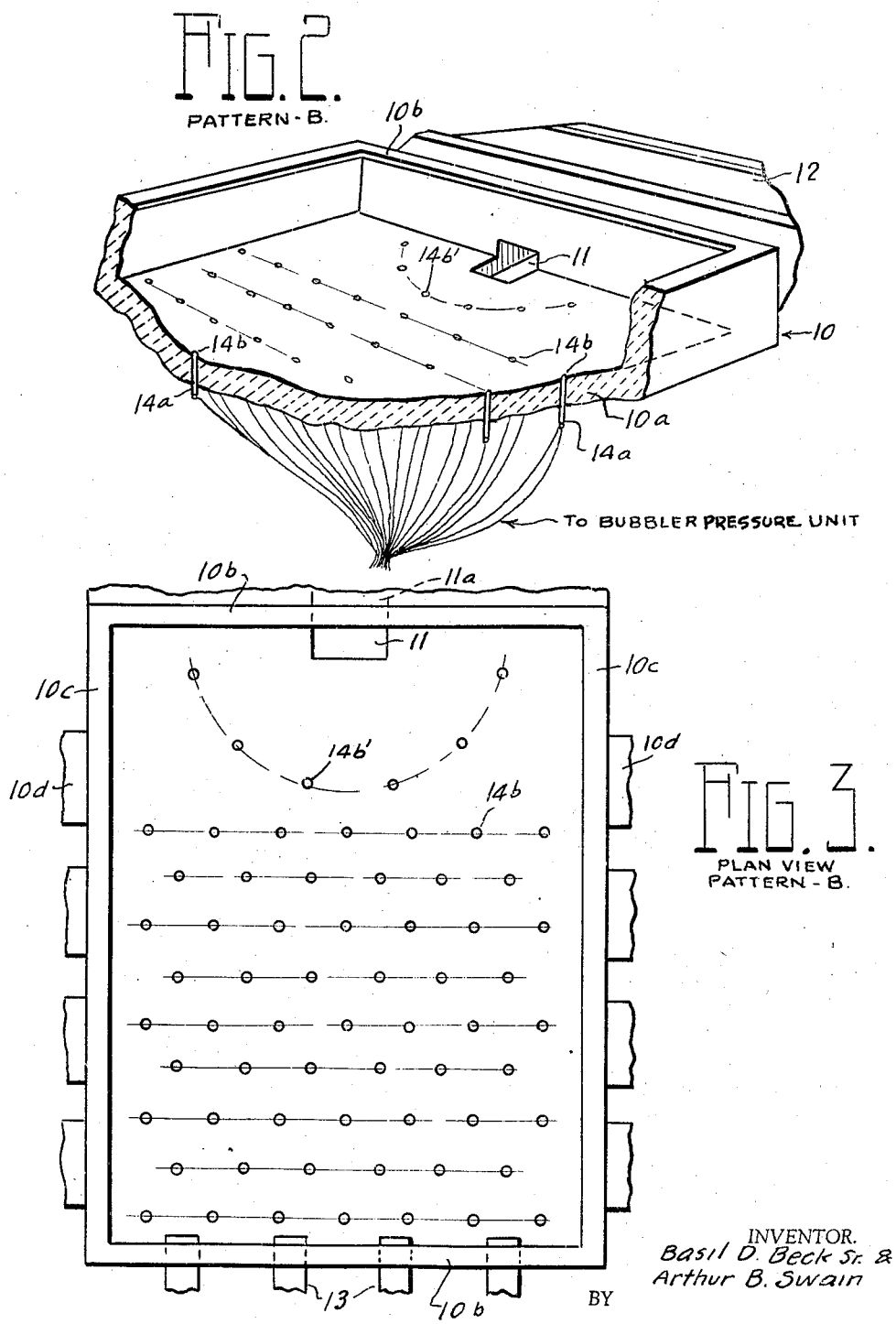

PATTERN C

PATTERN D

INVENTORS
Basil D. Beck Sr. &
Arthur B. Swain
BY
J. R. Nelson &
Leonard D. Soubier
ATTORNEYS Oct. 20, 1959 B. D. BECK, SR., ET AL 2,909,005
GLASS MELTING FURNACE WITH BUBBLER PATTERNS
Filed Nov. 13, 1956 4 Sheets-Sheet 4

PATTERN-E.

PATTERN-F.

INVENTOR.
Basil D. Beck Sr. &
Arthur B. Swain
BY
J. R. Nelson &
Leonard D. Soubier
ATTORNEYS

United States Patent Office 2,909,005
Patented Oct. 20, 1959

2,909,005

GLASS MELTING FURNACE WITH BUBBLER PATTERNS

Basil D. Beck, Sr., Bridgeton, N.J., and Arthur B. Swain, Toledo, Ohio, assignors to Owens-Illinois Glass Company, a corporation of Ohio Application November 13, 1956, Serial No. 621,609

12 Claims. (Cl. 49—54)

This invention relates to the efficient utilization of bubblers in a glass furnace, and more particularly to the patterns of arrangement of these bubblers and means for providing patterns of convection currents in the melting zone of a glass melting furnace to increase the efficiency and output of production of the furnace.

In this invention it is contemplated to provide a furnace or tank having interconnected glass containing compartments separated from each other by walls and interconnected by a submerged throat passage therebetween for the flow of molten glass from one compartment to the other.

Heat is supplied to the glass materials in the compartments of the furnace to maintain a body of molten glass therein. Within this body of molten glass, normal convection currents are present due to differentials in temperature and density throughout the glass body.

Also provided is a means for feeding the raw batch materials into the melter and bubbling means provided in the floor of the melter for stirring the molten glass by the formation of gaseous bubbles at the base of the glass body and causing the bubbles to rise therein. The rising action of the gaseous bubbles within the body of glass can be controlled by a pattern arrangement to create controlled curtains of convection currents which promote a more efficient melting cycle of the furnace, improve the quality of glass produced and increase its output.

The bubbles are formed by either a continuous or intermittent type bubbling device. The utility and mode of operation of each of the aforementioned type of bubblers is explained and disclosed in inventions of J. W. Wright; his U.S. Patent 2,387,222 covering the continuous type bubbler unit, and his U.S. Patent No. 2,890,548 entitled, "Means of Controlling Convection Currents of Molten Glass," covering the intermittent type bubbler unit.

It has been found in practice that various arrangements or patterns of placing the bubblers about the floor of the melter, regardless of the type of bubble producing unit utilized, produced, generally, increased efficiency and output or "pull" of the glass melter, along with the following specific improved results in the melter derived from such patterned arrangement of the bubblers, viz., (1) a more uniform homogeneity of the glass is produced, (2) certain types of stones such as nepheline and batch, are minimized, (3) the temperature gradient in the glass body between the floor of the melter and the glass surface is decreased, thereby promoting increased melter efficiency. (4) an increase in temperature of the glass in the refiner is obtained by increasing the temperature of the glass near the bottom of the melter. (5) any color or density separation is prevented from occurring in the melter in the production of colored glasses, such as Emerald Green and Champagne Green glasses. (6) an increase in the loads is obtained in melting the aforementioned colored glasses. (7) batch color streak or cord is eliminated in the production of lead-barium glass and borosilicate glass.

It is therefore an object of the present invention to provide installations of bubblers arranged in patterns along the floor of a glass melter which patterns achieve the aforementioned benefits for a glass furnace.

It is a further object of this invention to provide means for advantageously controlling patterns of convection currents internally of the glass body contained in the glass melting zone of a furnace by subjecting the normal convection currents in said body to a specific pattern of motion influenced by a curtain-like pattern of rising gaseous bubbles within the glass body to obtain the aforementioned benefits for a glass furnace.

It is still a further object of this invention to provide an installation of bubblers arranged around the throat outlet of a glass melter, plus a plurality of staggered transverse rows throughout a major portion of the remainder of the melting zone of the melter in which the individual bubblers may be selectively controlled to be made operative or inoperative, and thereby produce predetermined alterable patterns of rising gaseous bubbles throughout the latter-mentioned transverse rows of bubblers to obtain the desired control over convection currents in the body of glass in the melter.

The specific nature of this invention, as well as other objects and advantages thereof, will become apparent to those skilled in the art from the following detailed description.

In the accompanying drawings:

Fig. 1 is a cutaway perspective view, showing a glass melter provided with a plurality of intermittent type bubbling units, their bubbling nozzles being arranged about the floor of the melter according to pattern A.

Fig. 2 is a cutaway perspective view, similar to Fig. 1, wherein the melter is provided with a plurality of continuous type bubbling units, their bubbling nozzles being arranged about the floor of the melter according to pattern B.

Fig. 3 is a schematic plan view of the overall bubbler pattern B, which permits bubbling throughout a major portion of the melting zone of the melter, and permits, as an additional feature a means for selecting desired patterns of active bubblers, including the pattern shown in the figures or any other desired pattern.

Figure 4:
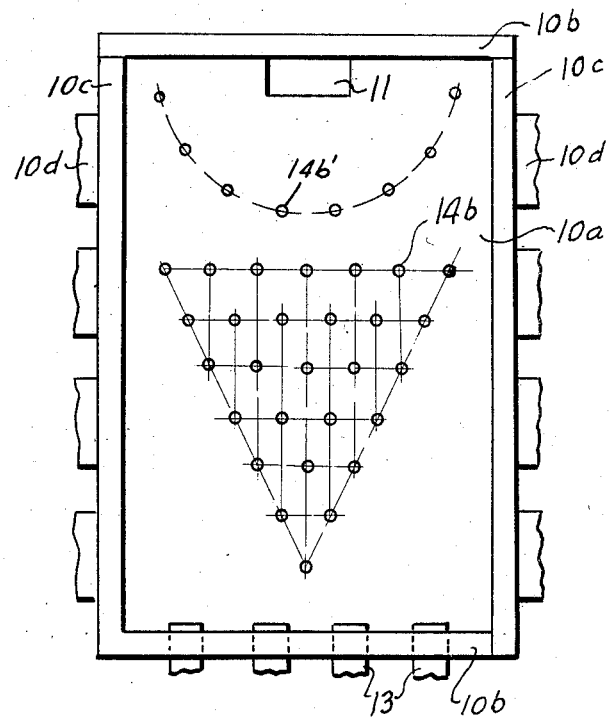
Figs. 4–7 are schematic plan views showing separate and distinct bubbler patterns C–F, respectively.

In Fig. 1 the lower rectangular portion of a glass melter for containing molten glass is identified by reference numeral 10, and comprises adjoining floor 10a, end walls 10b, and sidewalls 10c. Melter 10 is supported by a conventional structure (not shown). The lower portion of the melter 10 supports an upper covering structure (not shown) in which are located opposed firing ports 10d (shown schematically only in Figs. 3–7). At one end of melter floor 10a, adjacent the central portion of end wall 10b, is located throat outlet 11 which communicates with a throat passage 10a (Fig. 3) leading to the refiner 12 (partially shown in Fig. 2).

At the opposite end of melter 10 in the upper portion of one end wall 10b are dog houses 13 (shown only schematically in Figs. 3–7) utilized for feeding raw batch materials of a glass composition into melter 10. However, other means of batch feeding may be utilized with this invention, such as the overhead center type of batch feeding or blanket batch feeding over the top and along the length of the molten glass body.

Beneath melter floor 10a are interconnected a series of bubbler control units 14. These units 14 are each provided with a bubbler tube 14a terminating in a nozzle 14b or 14b' inserted into the molten glass body contained in the melter and interspersed about floor 10a in distinct pattern arrangements, which patterns will be hereinafter described.

Bubbler control units 14 are each connected by conduits 15 to high pressure manifolds 18 and similarly connected by conduits 16 to low pressure manifolds 17. High pressure manifolds 18 and low pressure manifolds 17 are connected respectively, to high pressure tank 19 and low pressure tank 20. Pressure supplied to the bubbler units 14 from the high pressure tank 19 is maintained sufficiently to explode measured volumes of the pressured gas into the bottom of melter 10 and overcome any pressure head presented by the depth of the glass body over bubbler nozzles 14b or 14b'.

The bubbler units shown in Fig. 1, operate to explode intermittently a series of enlarged gaseous bubbles, as shown and described by the aforementioned Patent No. 2,890,548 of J. W. Wright.

Fig. 2 illustrates the adaptability of a continuous type bubbler system, which is shown and described in aforementioned U.S. Patent No. 2,387,222.

Either type bubbler system is an example of a bubble producing device that is readily adaptable for use with this invention to produce the gaseous bubbles at bubbling nozzles 14b or 14b'. Let it be understood, therefore, that the subject of this invention contemplates the arrangement of bubblers about the melter floor to produce a pattern of bubbles rising in the molten glass of the melter by any form of satisfactory bubble-emitting apparatus. It is the pattern of distribution of the bubblers and not the specific bubbler utilized that fulfills the objects of this invention.

On the drawings, bubbler nozzles 14b and 14b' of bubbler units 14 are arranged in various patterns (numbered A–F) about the melter floor 10a, such that the bubbles being injected into the glass rise in a chain, one after the other, to create movement of the glass in curtain-like patterns. This curtain-like movement of glass is utilized to provide controlled patterns of convection currents in the melting zone of the glass melting furnace. The contour of these curtains of moving glass is defined by the particular pattern arrangement of bubblers employed.

Broadly described, each of the patterns shown in the figures comprises a first array of bubbler nozzles 14b' disposed in a substantially arcuate arrangement around throat outlet 11 at one end of melter 10, and a second array of bubbler nozzles 14b longitudinally spaced from the first array of said nozzles in the direction away from the throat outlet 11, wherein the second array of bubbler nozzles includes, in each case, at least one row of bubblers extending substantially transversely of the melter floor 10a.

In Figs. 1–7, the first array of bubbler nozzles 14b' is arranged to have said bubbler nozzles lie along a single substantially arcuate path about throat outlet 11. This arcuate path is described from the locus point of a circle situated in the throat passage 11 so that the bubbler nozzles 14b' are at substantially equally spaced distances from the point of withdrawal of molten glass from the body thereof maintained within the melter 10. This first array of bubbler nozzles, when gaseous bubbles are emitted therefrom, will provide a specific convection current motion in the molten glass at the forward end of the melter equally spaced from the throat.

The arrangement shown in Fig. 1, designated as pattern A, contains the aforementioned arcuate first array of bubbler nozzles 14b' around throat outlet 11 and a second array comprising a pair of transverse rows of bubbler nozzles 14b spaced from each other towards the batch-feeding end of melter 10 near the central portion of melter floor 10b. These bubbler nozzles may be positioned in staggered relationship, as shown, or may be in aligned relationship.

This arrangement of bubblers improves the melting of Emerald Green and Champagne Green glasses to greatly increase the furnace loads of the melter. The increased loads result in reduced stir losses brought about by the bubbling action of the second array of bubblers in this pattern, which comprises more than one transverse row of bubblers in the arrangement of said second array. A single row of bubblers is not sufficient to achieve this result, in that the bubbles are not produced fast enough to prevent the production of seeds in these glasses.

In Figs. 2 and 3, the bubbler-nozzle arrangement designated as pattern B, has this same arcuate spacing of bubbler nozzles 14b' in the first array, and the second array of bubbler nozzles 14b consists of a plurality of transverse spaced rows extending longitudinally the length of melter floor 10a towards the batch-feeding end of melter 10, the last of these transverse rows being near end wall 10b in which raw batch from dog houses 13 enters the melter. Pattern B provides principal convection-current control in the glass over the initial melting zone of the melter and secondary convection-current control near the throat outlet end.

The arrangement shown in Figs. 2 and 3 is adaptable to selective operation of bubblers 14 to produce any desired pattern of bubbling throughout the area of the melting zone covered by the transverse staggered rows of bubblers, including all the arrangements shown for the second array in Figs. 1–7, or any other geometric configuration of pattern desired. The various pattern configurations may be altered by placing a valve (not shown) in each high pressure gas line 15 (Fig. 1) leading to bubbler pressure control units 14. By closing this valve the bubbling operation of any selected bubbler control unit 14 may be stopped. Therefore, by selecting the desired pattern of bubblers 14b to be utilized in the floor of the melter, and closing off the flow of high pressure gas to the remainder of bubbler control units by closing their respective valve in line 15, the desired pattern effect may be achieved. Thus, by this arrangement, a desired bubbling pattern may be selected by making a simple adjustment to one or more of the many valves.

By utilizing all the bubblers, according to pattern B, the arrangement of the second array of bubblers enables a further increase of furnace loads over that obtainable by pattern A, above, and is advantageous in the production of amber glass, as it permits bubbling over a wide range of area in the melter, instead of in a localized area.

Fig. 4, representing pattern C, has a first array in an arcuate arrangement of bubbler nozzles 14b' about the throat outlet 11, as in patterns A and B, but the second array of said nozzles extends longitudinally in alternate rows spaced transverse of melter 10, said rows decreasing in length towards the batch-feeding end of the melter floor 10b to form of a solid wedge-shaped pattern. This arrangement provides principal convection-current control over the glass in the central melting zone of the melter, and enables bubbling at slower rates at various points in the furnace and produces repeated stirring during the melting process. This pattern lends itself particularly well to the production of amber glass and greatly reduces the amount of heavy mineral stones and viscous sacs therein.

Figure 5:
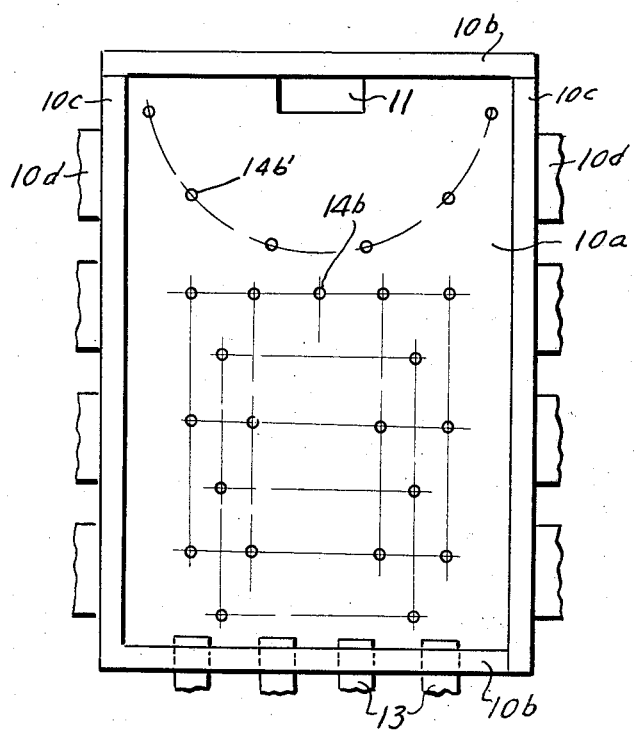

In Fig. 5, representing pattern D, its first array of bubbler nozzles 14b' retains the aforementioned single arcuate arrangement, but the second array of said nozzles comprises a single transverse row across the melter floor 10a spaced from the first array in the direction of the batch-feeding end of said floor and, in addition thereto, has six longitudinal rows intersecting said transverse row, three such longitudinal rows on either side of the center of melter floor 10a. The bubbler nozzles in each of these six rows are alternately staggered along their longitudinal spacing from the nozzles in the adjacent row. This arrangement provides convection-current control predominately near the central and rearward of the sides of the melter.

Figure 6:
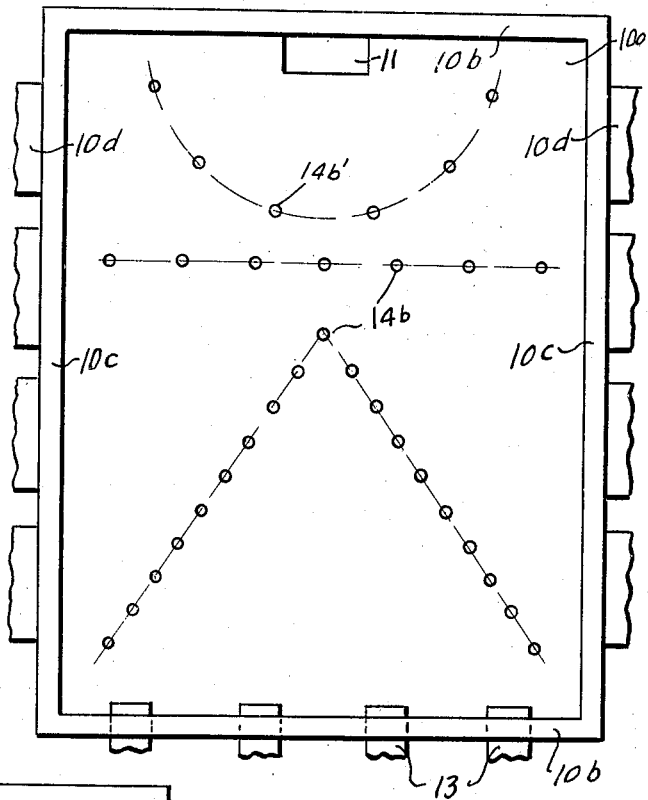

In Fig. 6, representing pattern E, the first array of bubbler nozzles 14b' lie along an arcuate path about throat outlet 11, and the second array of bubbler nozzles 14b comprises a single transverse row across the melter interposed between the single arcuate first array of bubblers and two oblique rows comprising a V-shaped arrangement extending from the corners of the batch-feeding end of the melter floor to substantially the center of the melting floor.

Figure 7:
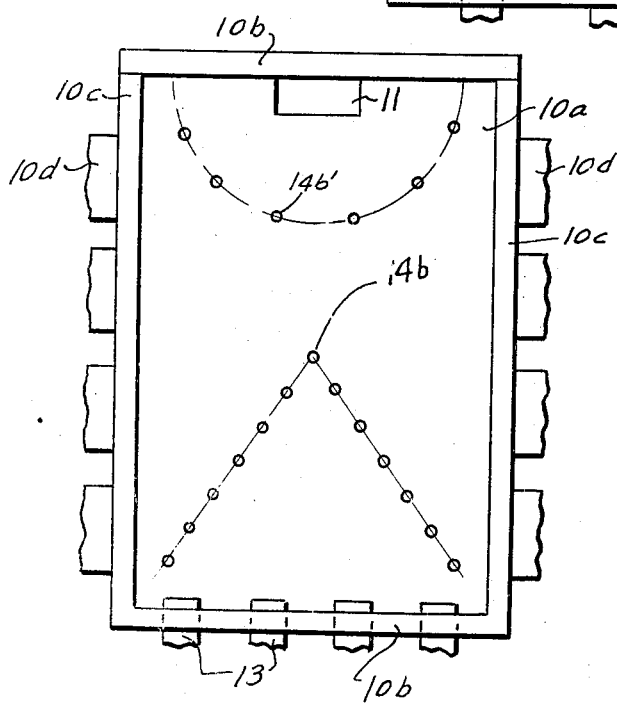

In Fig. 7, representing pattern F, the first array of bubbler nozzles 14b' lie in a single arcuate row about throat outlet 11, and the second array of bubbler nozzles 14b comprises the same two oblique rows in a V-shaped arrangement extending from the corners to the center of the melter floor, as found in pattern E (Fig. 6), but, in this pattern F, the intermediate single transverse row is omitted.

The various patterns of bubbler arrangements of the invention, as described above, contemplate in the main that increased furnace capacities and results are achieved by the utilization of bubbler patterns involving a first array of bubblers spaced substantially equal distances from the withdrawal throat and in addition thereto more than one (at least two) spaced rows of bubblers to comprise any given configuration or size of geometric patterns in the second array of bubblers.

It will, of course, be understood that various other arrangements of the bubblers may be utilized by mere modifications through a wide range of form and size to create still further variations from the patterns shown and described herein without departing from the principles of this invention. It is, therefore, not the purpose to limit the patent granted hereon otherwise than necessitated by the scope of the appended claims.

We claim:

1. In a glass melting furnace having a melting zone with batch feeding mechanism at one longitudinal end and a throat passage to a refining area at the opposite longitudinal end, the improvement comprising a first array of bubblers in the floor of said furnace disposed in an arcuate arrangement, said bubblers thereof being at substantially equally spaced distances from the center of said throat passage, and a second array of bubblers longitudinally spaced from said first array in the direction toward said batch feeding mechanism, said second array including a plurality of rows of bubblers in the floor of said furnace.

2. The combination defined in claim 1, wherein said second array of bubblers also extends longitudinally to the batch feeding end of said melting zone.

3. The combination defined in claim 1, wherein said rows of the second array of bubblers comprises a V-shaped arrangement of bubblers extending from the corners of the batch feeding end of said melting zone to substantially the center of said melting zone, and a transverse row of bubblers disposed intermediate said first array and the vertex of said V-shaped row.

4. The combination defined in claim 1, wherein the second array of bubblers also extends longitudinally of the melting zone in a plurality of rows including a central longitudinal row, the rows on either side of said central row decreasing in their length toward the batch feeding end of the melting zone to form a solid wedge-shaped pattern.

5. The combination defined in claim 1, wherein said second array of bubblers extends longitudinally in a plurality of rows, the bubblers in adjacent rows being staggered in their spacing from the bubblers in rows adjacent thereto.

6. In a glass melting furnace having a melting zone with a submerged throat passage to a refining area at one longitudinal end thereof, the improvement comprising a first array of bubblers in the floor of said furnace disposed in a substantially arcuate arrangement around said throat, and a second array of bubblers longitudinally spaced from said first array in the direction away from said throat, said second array including a plurality of rows of bubblers, at least one of which extends transversely of the melting zone, and at least one of the rows of said plurality thereof extending longitudinally to the end of said melting zone opposite the throat passage.

7. In a glass melting furnace having a melting zone with a submerged throat passage to a refining area at one longitudinal end thereof, the improvement comprising a first array of bubble producing units adapted to emit gaseous bubbles at the floor of said furnace and disposed in a substantially arcuate arrangement around said throat, a second array of said bubblers longitudinally spaced from said first array in the direction away from said throat, said second array comprising spaced transverse rows extending to the end of the melting zone opposite said throat, and means for selectively activating said bubbler units of said second array to emit gaseous bubbles in the form of predetermined patterns throughout said second array.

8. In a glass melting furnace having a melting zone with a submerged throat passage to a refining area at one longitudinal end thereof, the improvement comprising a first array of bubbler producing units adapted to emit gaseous bubbles at the floor of said furnace and disposed in a substantially arcuate arrangement around said throat, a second array of said bubblers longitudinally spaced from said first array in the direction away from said throat, said second array comprising spaced transverse rows extending to the end of the melting zone opposite said throat, said bubblers in each row being staggered from the bubblers in each succeeding row, and means for selectively activating said bubbler units of said second array to emit gaseous bubbles in the form of predetermined patterns throughout said second array.

9. In a glass melting furnace having a melting zone with a throat passage to a refining area at one end thereof, the improvement comprising a first array consisting of a first plurality of bubblers in the floor of said furnace and spaced about said throat passage such that they lie in an arcuate arrangement in relation to said throat passage, and a second plurality of bubblers in the floor of said furnace and spaced longitudinally therealong from the bubblers of said first plurality of bubblers.

10. In a glass melting furnace having a melting zone with a throat passage to a refining area at one longitudinal end, the improvement comprising a first array of bubblers in the floor of said furnace disposed in a substantially arcuate arrangement around said throat, and a second array of bubblers longitudinally spaced from said first array in the direction away from said throat, said second array including at least one row of bubblers in the floor of said furnace.

11. In a glass melting furnace having a melting zone with a throat passage to a refining area at one longitudinal end, the improvement comprising a first array of bubblers in the floor of said furnace disposed in an arcuate arrangement, the bubblers thereof being at substantially equally spaced distances from the center of said throat passage, and a second array of bubblers longitudinally spaced from said first array in the direction away from said throat, said second array including two rows of bubblers in the floor of said furnace and extending transversely of the melting zone.

12. In a glass melting furnace having a melting zone with batch feeding mechanism at one longitudinal end and a throat passage to a refining area at the opposite longitudinal end, the improvement comprising a first array of bubblers in the floor of said furnace disposed in a substantially arcuate arrangement around said throat, and a second array of bubblers longitudinally spaced from said first array in the direction away from said throat, said second array including a row of bubblers in the floor of said furnace extending transversely of the melting zone and a plurality of longitudinal rows extending from said transverse row, said longitudinal rows being disposed on opposite sides of the center of the melting zone, the said transverse and longitudinal rows of bubblers in said second array comprising a substantially U-shaped arrangement having its open end near the batch feeding end of the melting zone.

References Cited in the file of this patent
UNITED STATES PATENTS

| | | |
|---|---|---|
| 2,331,052 | Shadduck | Oct. 5, 1943 |
| 2,387,222 | Wright | Oct. 16, 1945 |